(12) United States Patent
Zhang

(10) Patent No.: US 10,380,288 B2
(45) Date of Patent: Aug. 13, 2019

(54) STRUCTURE AND GENERATION METHOD OF CLOCK DISTRIBUTION NETWORK

(71) Applicant: Shanghai Huali Microelectronics Corporation, Shanghai (CN)

(72) Inventor: Xueyuan Zhang, Shanghai (CN)

(73) Assignee: SHANGHAI HUALI MICROELECTRONICS CORPORATION, Shanghai (CN)

( * ) Notice: Subject to any disclaimer, the term of this patent is extended or adjusted under 35 U.S.C. 154(b) by 33 days.

(21) Appl. No.: 15/659,577

(22) Filed: Jul. 25, 2017

(65) Prior Publication Data

US 2018/0260507 A1 Sep. 13, 2018

(30) Foreign Application Priority Data

Mar. 13, 2017 (CN) .......................... 2017 1 0146090

(51) Int. Cl.
| | |
|---|---|
| *G06F 17/50* | (2006.01) |
| *H03K 19/00* | (2006.01) |
| *H01L 25/00* | (2006.01) |
| *G06F 1/3237* | (2019.01) |
| *G06F 1/10* | (2006.01) |

(52) U.S. Cl.
CPC ............ *G06F 17/5031* (2013.01); *G06F 1/10* (2013.01); *G06F 1/3237* (2013.01); *G06F 17/505* (2013.01); *G06F 17/509* (2013.01); *G06F 17/5077* (2013.01); *H03K 19/0016* (2013.01); *G06F 2217/62* (2013.01); *G06F 2217/84* (2013.01); *H01L 25/00* (2013.01)

(58) Field of Classification Search
CPC ............... G06F 17/5031; G06F 17/505; G06F 17/5077; G06F 17/509; G06F 2217/62; G06F 2217/84; G06F 1/3237; H03K 19/0016; H01L 25/00
USPC ....... 716/134, 122, 123, 124, 125, 114, 129, 716/130, 131; 703/16; 326/41, 47, 101
See application file for complete search history.

(56) References Cited

U.S. PATENT DOCUMENTS

| | | | | |
|---|---|---|---|---|
| 7,475,374 B1 * | 1/2009 | Johnson | ................ | G06F 17/505 716/115 |
| 7,911,253 B1 * | 3/2011 | Nassim | .................... | G06F 1/10 327/295 |
| 8,629,548 B1 * | 1/2014 | Andreev | ................... | G06F 1/10 257/691 |

(Continued)

*Primary Examiner* — Phallaka Kik
(74) *Attorney, Agent, or Firm* — Tianchen LLC

(57) ABSTRACT

The present invention provides a structure of a clock distribution network and generation method thereof. The clock distribution network is distributed in multiple local circuit modules. The clock distribution network comprises a clock tree structure and clock mesh structures, wherein the clock tree structure is distributed at least between or among the multiple local circuit modules and has a root node which is a clock access point of the clock distribution network. The clock mesh structures are distributed within at least one local circuit module at least according to a proportion of clock nodes in the local circuit module, a proportion of sequential circuits connected by clock in the local circuit module, a ratio of a total length of clock routing wirings in the local circuit module to a perimeter of the local circuit module, and a proportion of timing violation paths in the local circuit module.

4 Claims, 3 Drawing Sheets

(56) References Cited

U.S. PATENT DOCUMENTS

| | | | | |
|---|---|---|---|---|
| 8,966,425 B1* | 2/2015 | Eisenstadt | G06F 17/5077 | 716/120 |
| 8,994,404 B1* | 3/2015 | Or-Bach | H03K 19/096 | 326/41 |
| 9,503,057 B1* | 11/2016 | Venkata | H03K 3/01 | |
| 9,922,157 B1* | 3/2018 | Ebeling | G06F 17/5077 | |
| 2001/0020859 A1* | 9/2001 | Saeki | H03K 5/133 | 327/271 |
| 2003/0197537 A1* | 10/2003 | Saint-Laurent | G06F 1/10 | 327/165 |
| 2004/0153985 A1* | 8/2004 | Paul | G06F 17/5068 | 716/114 |
| 2006/0080632 A1* | 4/2006 | Ng | G06F 17/5068 | 716/116 |
| 2007/0016882 A1* | 1/2007 | Chen | G06F 17/5031 | 716/113 |
| 2007/0038430 A1* | 2/2007 | Walker | G06F 17/5022 | 703/14 |
| 2007/0247189 A1* | 10/2007 | Phil | H03K 19/17728 | 326/41 |
| 2007/0283305 A1* | 12/2007 | Reddy | G06F 1/10 | 716/113 |
| 2008/0276208 A1* | 11/2008 | Albrecht | G06F 17/5031 | 716/113 |
| 2008/0276209 A1* | 11/2008 | Albrecht | G06F 17/5031 | 716/113 |
| 2008/0276210 A1* | 11/2008 | Albrecht | G06F 17/5031 | 716/113 |
| 2008/0276212 A1* | 11/2008 | Albrecht | G06F 17/505 | 716/122 |
| 2010/0031214 A1* | 2/2010 | Hou | G06F 17/5072 | 716/119 |
| 2011/0066990 A1* | 3/2011 | Ono | G06F 17/5031 | 716/108 |
| 2012/0110538 A1* | 5/2012 | Shih | G06F 17/5077 | 716/129 |
| 2012/0159416 A1* | 6/2012 | Jiang | G06F 17/5031 | 716/113 |
| 2012/0176157 A1* | 7/2012 | Peng | G06F 17/505 | 326/93 |
| 2014/0062564 A1* | 3/2014 | Sathe | G06F 1/10 | 327/294 |
| 2014/0152372 A1* | 6/2014 | Lee | G06F 1/324 | 327/360 |
| 2014/0247080 A1* | 9/2014 | Moheban | G06F 1/10 | 327/295 |
| 2014/0289691 A1* | 9/2014 | Kasai | G06F 17/5072 | 716/122 |
| 2015/0134870 A1* | 5/2015 | Galloway | G06F 1/10 | 710/306 |
| 2015/0171835 A1* | 6/2015 | Gentner | H03K 5/1565 | 327/175 |
| 2015/0186560 A1* | 7/2015 | Jayakumar | G06F 17/505 | 327/297 |
| 2015/0186583 A1* | 7/2015 | Jayakumar | G06F 17/5072 | 716/123 |
| 2015/0186589 A1* | 7/2015 | Jayakumar | G06F 17/5077 | 716/119 |
| 2016/0299524 A1* | 10/2016 | Rajagopal | G06F 1/10 | |

\* cited by examiner

==Prior Art==

==Prior Art==

==Prior Art==

STRUCTURE AND GENERATION METHOD OF CLOCK DISTRIBUTION NETWORK

CROSS-REFERENCE TO RELATED APPLICATION

This application claims the priority benefit of China application serial no. 201710146090.9, filed Mar. 13, 2017. All disclosure of the China application is incorporated herein by reference.

FIELD OF THE INVENTION

The present invention relates to the field of digital integrated circuit design, and more particularly to the structure and generation methods of a clock distribution network.

BACKGROUND OF THE INVENTION

In the deep submicron technology, the design of synchronous clocks is vital to the performance and reliability of integrated circuits in chip design. In a clock distribution network, the time taken for clock signals to reach different registers should be synchronized. This requires distributions of all clock signals in the clock distribution network. A clock signal, an input from an external clock source or an output from an internal clock generator, passes through the clock distribution network constituted by combinational logic units and interconnects to sequential logic units.

At present, many clock tree structures have been proposed in the industry, which can be summarized as: tree-trunk structure, mesh structure, symmetrical H-tree structure and balanced buffer-tree structure, etc. In the above-mentioned structures, the balanced buffer-tree structure has been widely used in digital circuits.

The existing clock distribution networks are mainly divided into two categories:

1. Tree-Type Clock Distribution Network

Please refer to FIG. 1. FIG. 1 is a structure diagram showing a conventional tree-type clock distribution network. As shown in FIG. 1, the clock distribution network presents a tree-like structure, and the clock signals spread from root to branches. The tree-type clock distribution network is the earliest used clock generation technology.

It has advantages like simple algorithm, low consumption of layout and wiring resources and low power consumption; it has disadvantages like relatively weak timing performance, strong timing variations, great influence of process variation on timing sequence and the resulting low predictability of the timing sequence in front-end design and back-end design processes.

2. Mesh-Type Clock Distribution Network

Please refer to FIG. 2. FIG. 2 is a diagram showing the conventional mesh-type clock distribution network. As shown in FIG. 2, the clock distribution network presents a mesh-like structure, and the timing sequence gets balanced in the whole network. The mesh-type clock distribution network is a rather new clock distribution technology.

It has advantages like small timing variations, low influence of process variations on timing sequence, good predictability in front-end design and back-end design, and relatively stable performance; it has disadvantages of requiring relatively more layout and wiring resources and consuming more power.

SUMMARY OF THE INVENTION

Accordingly, at least one objective of the present invention is to provide a novel structure of a clock distribution network and generation method thereof, which greatly combines the benefits of the tree-type clock distribution network structure and the mesh-type clock distribution network structure in terms of digital circuit design and thus provides a more flexible clock distribution network solution for VLSI (very large scale integrated circuit) design.

To achieve these and other advantages and in accordance with the objective of the invention, as embodied and broadly described herein, the invention provides a structure of a clock distribution network, wherein, the clock distribution network is distributed in multiple local clock circuit modules; the clock distribution network comprises a clock tree structure and clock mesh structures, wherein the clock tree structure is distributed at least between or among the multiple local circuit modules and has a root node which is a clock access point of the clock distribution network; the clock mesh structures are distributed within at least one local circuit module at least according to one of the following: a proportion of clock nodes in the local circuit module, a proportion of sequential circuits connected by clock in the local circuit module, a ratio of a total length of clock routing wirings in the local circuit module to the perimeter of the corresponding local circuit module, and a proportion of timing violation in the local circuit module.

Furthermore, the clock mesh structures are distributed within at least one local circuit module according to the proportion of clock nodes in the local circuit module; for each local circuit module, if the proportion of clock nodes is more than 30% of the total local circuit nodes, the clock mesh structures are distributed therein; otherwise, the clock tree structure is distributed therein.

Furthermore, the clock mesh structures are distributed within at least one local circuit module according to the proportion of sequential circuits connected by clock in the local circuit module; for each local circuit module, if the proportion of sequential circuits connected by the clock is more than 20% of all the circuits in the local circuit module, the clock mesh structures are distributed therein; otherwise, the clock tree structure is distributed therein.

Furthermore, the clock mesh structures are distributed within at least one local circuit module according to the ratio of the total length of clock routing wirings in the local circuit module to the perimeter of the local circuit module; if the total length of the clock routing wirings in the local circuit module is 3 times longer than the perimeter of the local circuit module, the clock mesh structures are distributed therein; otherwise, the clock tree structure is distributed therein.

Furthermore, the clock mesh structures are distributed within at least one local circuit module according to the proportion of timing violations in the local circuit module; for each local circuit module, if the proportion of the timing violations is more than a predefined percentage, the clock mesh structures are distributed therein; otherwise, the clock tree structure is distributed therein.

Furthermore, each local circuit module comprises multiple clock circuits.

To achieve the above objectives, the invention also provides a method for generating the aforesaid clock distribution network, comprising the following steps:

step S1: applying a clock tree structure at least between or among the multiple local circuit modules; wherein, the clock tree structure has a root node which is a clock access point of the clock distribution network and branch interconnects distributed between or among the local circuit modules;

step S2: starting from the clock access point of the clock distribution network to an end point of the clock distribution network along the branch interconnects, determining whether to apply clock mesh structures within a next local circuit module at least according to one of the following: a proportion of clock nodes in the local circuit module, a proportion of sequential circuits connected by clock in the local circuit module, a ratio of total length of clock routing wirings in the local circuit module to the perimeter of the local circuit module, or a proportion of timing violation in the local circuit module; if yes, turn to step S3; otherwise, turn to step S4;

step S3: applying the clock mesh structures in the next local circuit module;

step S4: applying the clock tree structure in the next local circuit module.

As is disclosed above, the clock distribution network and its generation method of the present invention provides an innovative clock network synthesis technology solution for digital sequential circuit design. It combines the tree-type clock network with the mesh-type clock network, which offers a more flexible design idea and algorithm to the design of VLSI.

BRIEF DESCRIPTION OF THE DRAWINGS

The clock distribution network and generation method thereof of the present invention will be elucidated by reference to the following embodiments and the accompanying drawings, in which.

DETAILED DESCRIPTION OF THE EMBODIMENTS

The invention will be described in further details hereinafter with respect to the embodiments and the accompanying drawings of FIGS. 3-5.

It is important to note that the clock distribution network and generation method thereof of the present invention greatly combines the benefits of clock tree network and clock mesh network in terms of digital circuit design and provides an optimal solution for circuit design.

In the embodiments of the present invention, the global clock distribution network is distributed in multiple local circuit modules; each local circuit module can serve as a small function module and comprise multiple sequential circuits. Distinguished from the existing technology, the present invention applies a clock tree structure between or among the multiple local circuit modules while applies clock mesh structure or the clock tree structure within the local circuit modules according to practical calculation results of timing sequence and actual situation of the local circuit modules.

That is, the clock tree structure of the present invention starts from the clock access point of the clock distribution network, which is taken as the root node of the tree structure. The clock mesh structures are distributed within at least one local circuit module.

Figure 1:
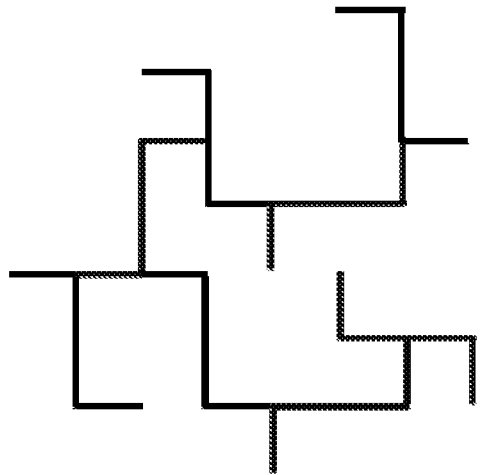
FIG. 1 is a diagram showing the conventional tree-type clock distribution network.
Figure 2:
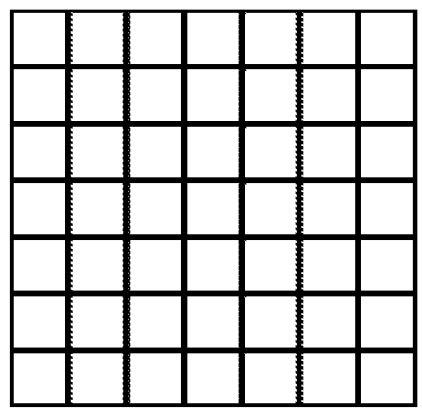
FIG. 2 is a diagram showing a conventional mesh-type clock distribution network.
Figure 3:
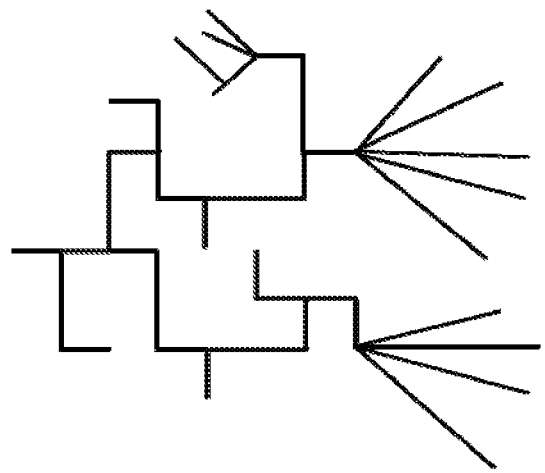
FIG. 3 is a diagram showing the structure of a conventional clock distribution network.
Figure 4:
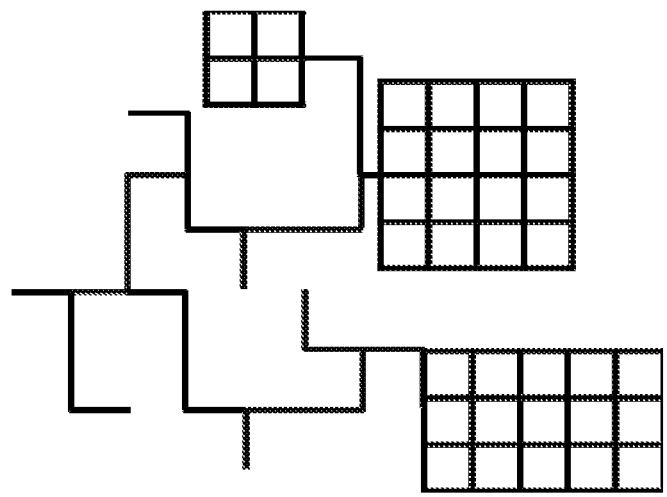
FIG. 4 is a diagram showing the structure of a clock distribution network according to a preferred embodiment of the present invention.
Figure 5:
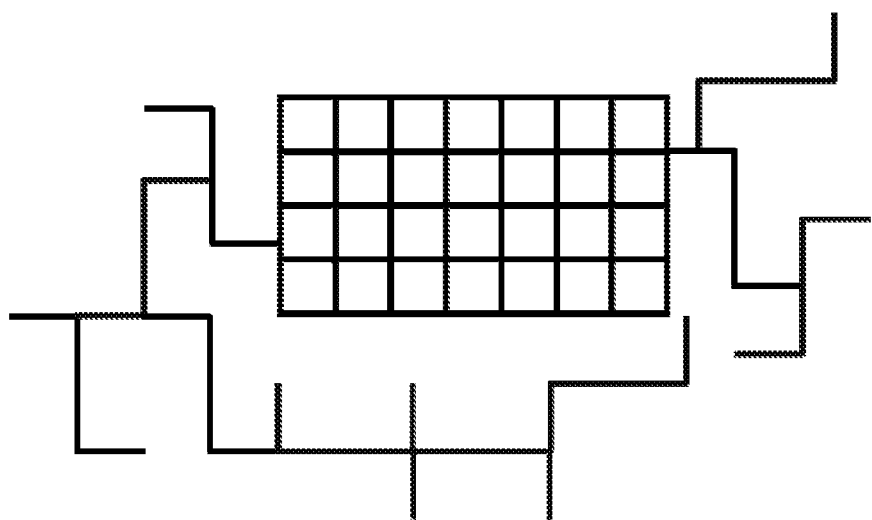
FIG. 5 is a diagram showing the structure of a clock distribution network according to another preferred embodiment of the present invention.

Please refer to FIG. 3 to FIG. 5. FIG. 3 is a diagram showing a conventional tree-type clock distribution network, FIG. 4 illustrates a clock distribution network according to an embodiment of the present invention, and FIG. 5 illustrates a clock distribution network according to another embodiment of the present invention. The solution to improve the conventional clock distribution network shown in FIG. 3, as one embodiment of the present invention, is mainly as follows:

In the embodiment, the advantages of the tree-type clock distribution network in layout wiring resources and power consumption are efficiently utilized by distributing the clock tree structure between or among the local circuit modules for synthesis of the global clock distribution network, so as to save the global layout wiring resources and lower the power of the chip. Furthermore, the clock mesh structures are distributed within some local circuit modules, according to practical calculation results of timing sequence and actual situations of the circuit modules. The clock mesh structures can minimize the differences of timing sequence occurred in different local circuit modules, optimize the circuit timing sequence design, and meanwhile strengthen the tolerance of process variations of the clock distribution network.

In the embodiment of the present invention, whether or not to distribute the clock mesh structures within the local circuit module can be determined according to any one of the following parameters: a proportion of clock nodes in the local circuit module, a proportion of sequential circuits connected by clock in the local circuit module, a ratio of the total length of clock routing wirings in the local circuit module to the perimeter of the local circuit module, and a proportion of timing violation in the local circuit module.

It is important to note that when determining whether or not to distribute the clock mesh structures within the local circuit module, one or more of the above parameters can be used. For example, for a local circuit module, if any of the following conditions is satisfied, then the clock mesh structures are applied in the local circuit module, or else the clock tree structure is applied:

1. The proportion of clock nodes in the local circuit module is more than 30% of the total local circuit nodes. Clearly, the proportion of 30% is only a preferred example and does not set any limits to the present invention.

2. The proportion of sequential circuits connected by the clock in the local circuit module is more than 20% of the total circuits in the local circuit module. Clearly, the proportion of 20% is only a preferred example and does not set any limits to the present invention.

3. The total length of clock routing wirings in the local circuit module is 3 times longer than the perimeter of the local circuit module. Clearly, the multiple of 3 is only a preferred example and does not set any limits to the present invention.

4. The proportion of the timing violations is more than 30%. Clearly, the proportion of 30% is only a preferred example and does not set any limits to the present invention.

Turning next to FIG. 4, which illustrates a clock distribution network according to a first embodiment of the present invention. In the embodiment, the clock mesh structures are distributed in the local circuit modules which are lied at the end of the clock distribution network (the end of the branch interconnects of the clock tree structure). As a result, the clock mesh structures can be taken as "leaves" of the tree. This hybrid clock distribution network is more like a true tree in shape (with tree root, branches and leaves). Therefore, it can be called as a True-Tree-like clock distribution network or Tree-Leaf-like clock distribution network.

Please refer to FIG. 5, which illustrates a clock distribution network according to a second embodiment of the present invention. In the embodiment, the clock mesh structures are distributed in the local circuit modules which are lied in the critical paths of the clock distribution network. The term "critical paths" refers to paths formed by a series of local circuit modules with a large amount of sequential logic circuits, which is of great importance to timing sequence design. In the embodiment, the clock mesh structures provide aid in sequence optimization for the critical paths due to the good sequence balance capability. As shown in FIG. 5, the clock mesh structures distributed in the critical paths can achieve more balanced timing sequence distribution, offer more clock access points, and provide more flexibility for local sequential circuit design. Certainly, for those local circuit modules not in the critical paths, there is no need to waste valuable layout wiring resources to make mesh-type clock network design. The synthesis method of the clock distribution network is described in detail in below embodiment, which comprises the following steps:

Step S1: applying a clock tree structure at least between or among the multiple local circuit modules; wherein, the clock tree structure has a root node which is a clock access point of the clock distribution network and branch interconnects distributed between or among the local circuit modules;

step S2: starting from the clock access point of the clock distribution network to an end point of the clock distribution network along the branch interconnects; determining whether to apply clock mesh structures within a next local circuit module according to at least one of the following: a proportion of clock nodes in the local circuit module, a proportion of sequential circuits connected by clock in the local circuit module, a ratio of a total length of clock routing wirings in the local circuit module to the perimeter of the local circuit module, or a proportion of timing violation in the local circuit module; if yes, turn to step S3; otherwise, turn to step S4.

step S3: applying the clock mesh structures in the next local circuit module;

step S4: applying the clock tree structure in the next local circuit module.

Wherein, step S2 comprises determining whether the proportion of clock nodes in the next local circuit module is more than 30% of the total local circuit nodes, whether the proportion of sequential circuits connected by the clock in the next local circuit module is more than 20% of the total circuits in the next local circuit module, whether the total length of the clock routing wirings in the next local circuit module is 3 times larger than the perimeter of the next local circuit module, and whether the proportion of the timing violations in the next local circuit module is more than 30%, if anyone is yes, turn to step S3, otherwise turn to step S4.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A structure of a clock distribution network constituted by combinational logic units and interconnects, wherein the clock distribution network is distributed in multiple local circuit modules; wherein the clock distribution network comprises a clock tree structure and clock mesh structures, wherein the clock tree structure has branch interconnects distributed at least between or among the multiple local circuit modules and has a root node which is a clock access point of the clock distribution network; the clock mesh structures are distributed within at least one local circuit module according to at least one of the following: a proportion of clock nodes in the local circuit module, a proportion of sequential circuits connected by a clock in the local circuit module, a ratio of the total length of clock routing wirings in the local circuit module to a perimeter of the local circuit module, and a proportion of timing violation in the local circuit module; for each local circuit module, if the proportion of clock nodes is more than 30% of the total local circuit nodes, or the proportion of sequential circuits connected by the clock is more than 20% of the total circuits in the local circuit module, or the total length of the clock routing wirings in the local circuit module is 3 times longer than the perimeter of the local circuit module, or the proportion of the timing violations is more than a predefined percentage, then the clock mesh structures are distributed therein; otherwise, the clock tree structure is distributed therein.

2. The structure of the clock distribution network according to claim 1, wherein, each local circuit module comprises multiple clock circuits.

3. A method, comprising the following steps:
   step S1: applying a clock tree structure at least between or among the multiple local circuit modules; wherein, the clock tree structure has a root node which is a clock access point of the clock distribution network and branch interconnects distributed between or among the local circuit modules;
   step S2: starting from the clock access point of the clock distribution network to an end point of the clock distribution network along the branch interconnects, determining whether to apply clock mesh structures within a next local circuit module according to at least one of the following: a proportion of clock nodes in the local circuit module, a proportion of sequential circuits connected by a clock in the local circuit module, a ratio of the total length of clock routing wirings in the local circuit module to a perimeter of the local circuit module, or a proportion of timing violation in the local circuit module; if the proportion of clock nodes in the next local circuit module is more than 30% of the total local circuit nodes, or the proportion of sequential circuits connected by the clock is more than 20% of the total circuits in the local circuit module, or the total length of the clock routing wirings in the local circuit module is 3 times longer than the perimeter of the local circuit module, or the proportion of the timing violations in the next local circuit module is more than a predefined percentage, applying the clock mesh structures in the next local circuit module; otherwise, applying the clock tree structure in the next local circuit module
   step S3: designing and fabricating an integrated circuit based at least on the resulting structure of the clock distribution network.

4. The method according to claim 3, wherein, each local circuit module comprises multiple clock circuits.

* * * * *